United States Patent [19]

Watson

[11] 4,257,744
[45] Mar. 24, 1981

[54] IMPELLER AND SHAFT ASSEMBLY FOR HIGH SPEED GAS COMPRESSOR

[75] Inventor: Thomas E. Watson, Staunton, Va.

[73] Assignee: Westinghouse Electric Corp., Pittsburgh, Pa.

[21] Appl. No.: 22,403

[22] Filed: Mar. 21, 1979

[51] Int. Cl.³ .................. F04D 29/22; F16B 4/00; F16B 7/02

[52] U.S. Cl. .................. 416/244 R; 403/282; 403/359

[58] Field of Search .............. 416/244 R, 244 A; 403/260, 282, 333, 334, 359

[56] References Cited

U.S. PATENT DOCUMENTS

| | | | |
|---|---|---|---|
| 1,403,309 | 1/1922 | Follows | 403/282 |
| 1,445,142 | 2/1923 | Kirkham | 403/334 |
| 1,511,910 | 10/1924 | Royce | 403/359 |
| 2,119,334 | 5/1938 | Leffler | 403/283 |
| 3,601,501 | 8/1971 | Johnson et al. | 416/244 R |
| 3,673,777 | 7/1972 | Weber | 403/282 |
| 4,118,134 | 10/1978 | Mansel | 403/359 |

FOREIGN PATENT DOCUMENTS 567958  12/1923  France .................. 416/244 R

*Primary Examiner*—John J. Vrablik
*Attorney, Agent, or Firm*—E. C. Arenz

[57] ABSTRACT

An impeller and shaft assembly includes an outwardly tapered socket 38 in the rear face of the impeller 12 and into which a frusto-conically shaped extremity 20 seats, the extremity circumferential wall having a plurality of axially extending grooves 42 alternating with intervening lands 44, the socket and extremity being dimensioned and configured so that in the finally seated relation of the parts the land plastically deforms the socket material which has a lower compressive yield strength than the extremity.

6 Claims, 4 Drawing Figures

IMPELLER AND SHAFT ASSEMBLY FOR HIGH SPEED GAS COMPRESSOR

BACKGROUND OF THE INVENTION

1. Field of the Invention

The invention pertains to the art of impeller and shaft assemblies for centrifugal gas compressors such as are used in relatively large air-conditioning machinery and in which the impellers rotate at speeds of 10,000 to 30,000 revolutions per minute and up.

2. Description of the Prior Art

It is relatively important that centrifugal gas compressor impellers and shaft mounting arrangements for such machines be such that adequately high torque capacity be provided while also permitting removal and reinstallation of the impeller to the shaft without undue difficulty.

In the known commercial art, one arrangement which functions satisfactorily on compressors of a given size is disclosed in U.S. Pat. No. 3,601,501 and discloses conically shaped washers and impeller surfaces which mate and provide a friction fit with the parts held tightly together by a cap screw.

Another current arrangement in generally satisfactory use for certain centrifugal gas compressors has spiral threads machined on both the front end of the driving shaft and the mating surface at the rear of the impeller wheel, the spiral threads being required to be carefully mated when the wheel is installed. However, this arrangement has several disadvantages. For example, the machining of the threads is relatively difficult and expensive. To check that the threads are correctly machined, a given dimension ball is rolled in the grooves for their length to determine correct groove depth. In installation, this spiral threaded arrangement is neither self-centering nor self-aligning to the degree desired to be attained in connection with my invention.

Also in the known prior art, both U.S. Pat. No. 1,403,309 and No. 2,119,334 disclose shaft and gear or pulley arrangements in which spirally directed grooves or protrusions are provided in one or the other of the parts so that the material of one of the parts will be displaced in the pattern of the spiral on the other part to promote a tight connection.

None of these arrangements is considered to have all of the advantages of the arrangement according to my invention, which provides a high torque capacity, is relatively easy to machine and install, is self-centering and self-aligning in installation, and permits closer tolerances to be held so that vibration and seal damage of high speed impellers is reduced.

SUMMARY OF THE INVENTION

In accordance with the essence of the invention, there is provided a rotatable shaft having a threaded axial bore in its driving end, and impeller with an axial bore therethrough and adapted to be assembled to the driving end portion of the shaft with a fastener having a threaded shaft passing through the impeller axial bore and threaded into the shaft bore, the rear face of the impeller having a socket surrounding the rear end of the axial bore of the impeller, with the circumferential walls of the socket tapering slightly outwardly, the driving end portion of the shaft having a basically frusto-conical shaped extremity received in wedging relation in the socket, the circumferential wall of the extremity including a plurality of forwardly open, axially-extending grooves circumferentially spaced therearound and alternating with intervening lands, the impeller socket being comprised of a material of lower compressive yield strength than the material forming the surface of the shaft extremity, and the circumferential dimension of the shaft extremity as defined by the lands being slightly larger than the facing circumferential dimension of the wall of the socket in the finally seated relation of the shaft extremity in the socket, so that with said shaft extremity being wedged into place by the fastener, the lands plastically deform the material of the impeller socket in an outward direction.

DRAWING DESCRIPTION

DESCRIPTION OF THE PREFERRED EMBODIMENT

Figure 1:
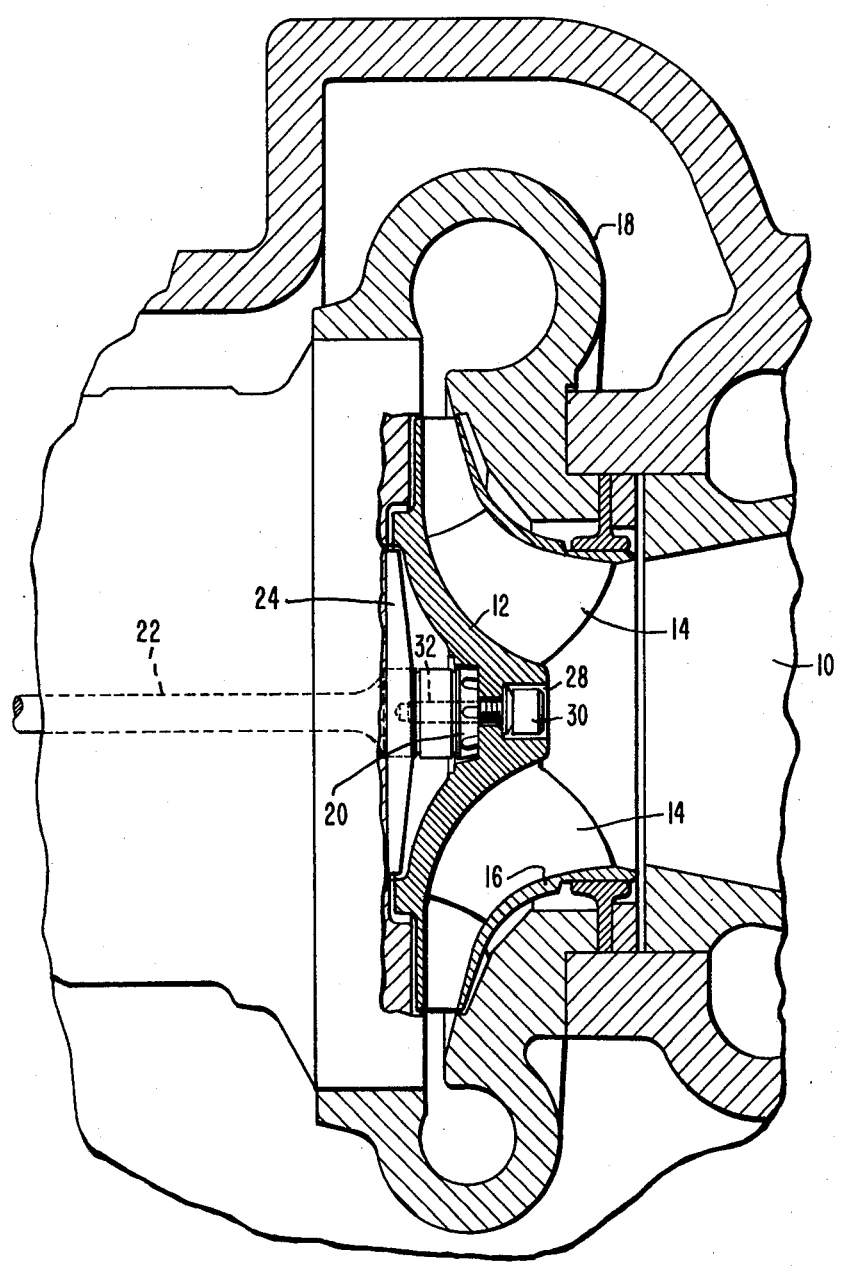
FIG. 1 is a fragmentary side elevational view, partly in section, of a gas compressor including the impeller and shaft assembly of the invention.

Referring to FIG. 1, a centrifugal gas compressor of the type to which the invention may be applied is shown for example, and includes an inlet 10 through which gas flows to the impeller which includes a hub 12 portion, vanes 14, and shroud 16. The gas compressed by the impeller in operation is passed into a gas collecting scroll 18.

The impeller is securely fastened to the front end extremity 20 of a drive shaft 22 which extends rearwardly through a gear cover 24 and is driven at a relatively high speed by a gear arrangement, not shown herein. For information as to additional details of the construction of the compressor as a whole and its drive arrangement, reference should be had to U.S. Pat. No. 3,635,579.

Figure 2:
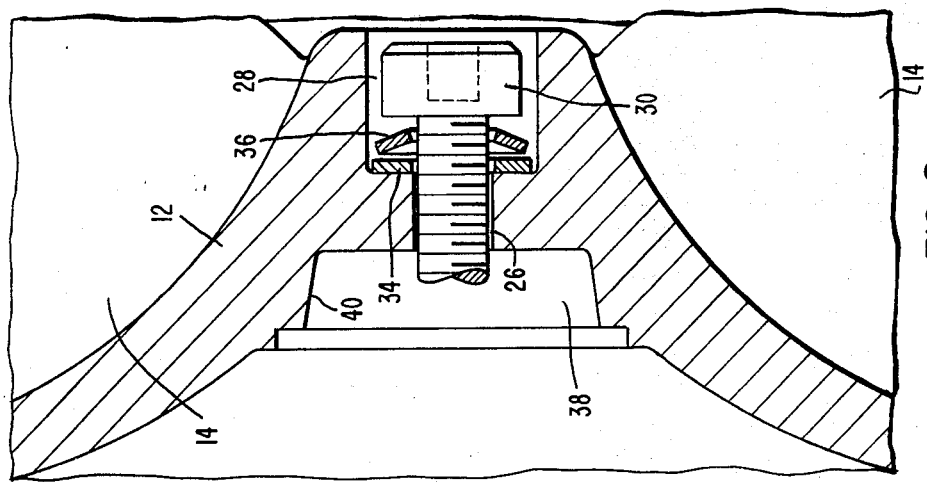
FIG. 2 is a fragmentary sectional view of the hub portion of the impeller and fastener means.
Figure 4:
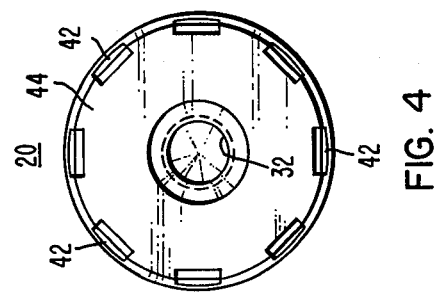
FIG. 4 is an end view of the extremity of the driving end of the shaft.
Figure 3:
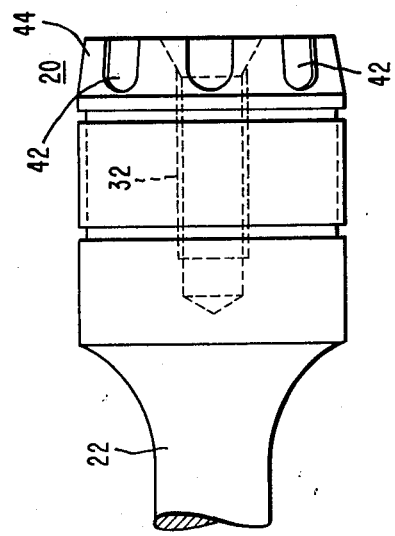
FIG. 3 is a side view of the driving end portion of the shaft.

Referring now to FIG. 2, the impeller hub portion 12 is comprised of a permanently molded aluminum alloy casting, such as alloy C355-T61 as available from the Aluminum Company of America, for example. The impeller has an axial bore 26 extending through its center and a counterbored recess 28 at its front. A fastener with a threaded shaft, such as cap screw 30, is provided to extend through the bore 26 and into a threaded bore 32 extending from the front face of the extremity 20 concentrically into the shaft forward end portion (FIGS. 3 and 4). A steel washer 34 and a spring or Belleville washer 36 are fitted on the shaft of the cap screw and seat in the recess 28 when the impeller is tightened to the drive shaft.

In accordance with the essential features of the invention, the rear surface of the impeller is provided with a frusto-conically shaped socket 38 machined therein, the circumferential wall 40 tapering outwardly slightly. In one satisfactory arrangement of the invention, the angle of taper of the circumferential wall 40 is between 7.5° and 8°.

Turning now to FIGS. 3 and 4, the driving end portion of the shaft 22 has the basically frusto-conical shaped extremity 20 which is adapted to be received in wedging relation in the socket 38. The circumferential wall of the extremity includes a plurality of forwardly-open, axially extending grooves 42 which are circumferentially spaced therearound and alternate with intervening lands 44. The material of which the shaft, and particularly the extremity 20, is formed has a compressive yield strength significantly higher than the material forming the socket of the impeller. One satisfactory material of which a shaft has been formed is a medium carbon alloy steel, such as that designated 41L40 which will have a compressive yield strength between about 100,000 to about 200,000 psi, depending upon the particular treatment.

The circumferential dimension of the shaft extremity 22 as defined by the lands is slightly larger than the facing circumferential dimension of the circumferential wall 40 of the socket 38 in the finally seated relation of the shaft extremity in the socket. The circumferential dimension relationships of these parts is such that with the shaft extremity wedged into place by tightening the fastener 30 (FIG. 2), the lands 44 plastically deform the material of the impeller socket wall 40 in an outward direction at those locations. To that end, and to promote self-centering and self-aligning, the angle of the taper of the circumferential wall of the extremity, as defined by the lands 44, is between 8.0° and 8.5°. Additionally, in one satisfactory arrangement I have devised, the diameter of the circumferential wall of the extremity as defined by the lands at the front face of the extremity is nearly 1% larger than the diameter at the seat of the socket 38. Accordingly, when the members are fastened together in their final relationship, by applying a given torque to the fastener 30, the opposing faces of the front end of the extremity 20 and the socket base will not seat tightly. The groovers 42 can be relatively shallow since the displacement of the socket circumferential wall 40 portions is relatively slight. In viewing the indentations in the socket wall 40 after an installed impeller has been removed, the observer must look closely to find the indentations, but they are readily perceptible with the naked eye.

With the arrangement according to the invention, the torque capacity is about three times the torque capacity for a smooth surfaced basic cone clutch arrangement. While the torque capacity is very significantly increased, the force required to release the impeller from the shaft extremity is not increased to the extent that any difficulty in practical application is experienced.

The torque applied to the cap screw 30 is calculated to obtain the plastic deformation referred to above in view of the dimensional relationships. The Belleville washer functions to maintain the axial force, but it does not increase substantially the engagement friction in an axial direction.

I claim:

1. A rotatable gas compressor impeller and shaft assembly comprising:
   a rotatable shaft having a threaded axial bore in its driving end;
   an impeller having an axial bore therethrough and adapted to be assembled to the driving end portion of said shaft with a fastener haing a threaded shaft passing through the impeller axial bore and threaded into said shaft bore;
   the rear face of said impeller having a socket surrounding the rear end of said axial bore in the impeller, the circumferential walls of said socket tapering slightly outwardly;
   said driving end portion of said shaft having a basically frusto-conical shaped extremity received in wedging relation in said socket, the circumferential wall of said extremity including a plurality of forwardly-open, axially-extending grooves circumferentially spaced therearound and alternating with intervening lands;
   said impeller socket being comprised of a material of lower compressive yield strength than the material forming the surface of said shaft extremity, and the circumferential dimension of said shaft extremity as defined by said lands being slightly larger than the facing circumferential dimension of the wall of said socket in the finally seated relation of said shaft extremity in the socket so that with said shaft extremity being wedged into place by said fastener the lands plastically deform the material of said impeller socket in an outward direction.

2. The assembly of claim 1 wherein:
   the angle of outward taper of said socket wall is less than the taper angle of the circumferential wall of said extremity.

3. The assembly of claim 1 wherein:
   the angle of taper of said socket wall is in a range of about 0 to 1 degree less than the taper angle of the circumferential wall of said extremity.

4. The assembly of claim 1 wherein:
   said material of said impeller socket is an aluminum alloy and the material of said shaft extremtiy is steel.

5. The assembly of claim 1 or 4 including:
   a spring washer on said fastener shaft between the head of said fastener and said impeller.

6. The assembly of claim 3 wherein:
   the circumferential dimension of the front face of said extremity slightly exceeds the circumferential dimension of the seat of said socket.

* * * * *